US012457656B2

(12) United States Patent
Wu et al.

(10) Patent No.: US 12,457,656 B2
(45) Date of Patent: Oct. 28, 2025

(54) DUAL CONNECTIVITY FOR RELIABILITY

(71) Applicant: Apple Inc., Cupertino, CA (US)

(72) Inventors: Geng Wu, Portland, OR (US); Qian Li, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 18/453,396

(22) Filed: Aug. 22, 2023

(65) Prior Publication Data

US 2024/0057186 A1 Feb. 15, 2024

Related U.S. Application Data

(63) Continuation of application No. 17/032,178, filed on Sep. 25, 2020, now Pat. No. 11,778,675, which is a
(Continued)

(51) Int. Cl.
H04W 76/15 (2018.01)
H04L 45/00 (2022.01)
(Continued)

(52) U.S. Cl.
CPC ........... *H04W 76/15* (2018.02); *H04L 45/22* (2013.01); *H04L 45/24* (2013.01); *H04L 45/302* (2013.01);
(Continued)

(58) Field of Classification Search
CPC ............. C10M 139/00; C10M 141/12; C10M 159/18; C10M 2207/027; C10M 2207/12;
(Continued)

(56) References Cited

U.S. PATENT DOCUMENTS 9,521,571 B2 12/2016 Yilmaz et al.
2010/0234071 A1 9/2010 Shabtay et al.
(Continued)

FOREIGN PATENT DOCUMENTS

WO 2015023449 A2 2/2015
WO 2017039736 A1 3/2017

OTHER PUBLICATIONS

"International Application Serial No. PCT/US2015/066688, International Preliminary Report on Patentability mailed Jul. 25, 2016", 11 pgs.
(Continued)

Primary Examiner — Nizam U Ahmed
(74) Attorney, Agent, or Firm — Kowert, Hood, Munyon, Rankin & Goetzel, P.C.

(57) ABSTRACT

Embodiments of a system and method for dual connectivity for device to vehicle or vehicle to vehicle communication in a Wireless Network are generally described herein. In some embodiments, processing circuitry may determine a quality of service (QoS) level for data to be transmitted over a first radio access technology (RAT) connection and determine a QoS indicator from the QoS level, the QoS indicator identifying a dual connectivity backup transmission, the dual connectivity backup transmission including a hot, warm, or cold backup. In some embodiments, transceiver circuitry may attempt to transmit the data using a first transmission mode, the first transmission mode using the first RAT connection and the data including the QoS indicator and retransmit, in response to the attempt failing, the data using a second transmission mode.

20 Claims, 6 Drawing Sheets

Related U.S. Application Data continuation of application No. 15/749,717, filed as application No. PCT/US2015/066688 on Dec. 18, 2015, now abandoned.

(60) Provisional application No. 62/212,235, filed on Aug. 31, 2015.

(51) Int. Cl.

| | | |
|---|---|---|
| *H04L 45/24* | (2022.01) | |
| *H04L 45/302* | (2022.01) | |
| *H04W 4/40* | (2018.01) | |
| *H04W 28/24* | (2009.01) | |
| *H04W 40/12* | (2009.01) | |
| *H04W 72/543* | (2023.01) | |
| *H04W 76/10* | (2018.01) | |
| *H04W 88/06* | (2009.01) | |

(52) U.S. Cl.
CPC ............. *H04W 4/40* (2018.02); *H04W 28/24* (2013.01); *H04W 40/12* (2013.01); *H04W 72/543* (2023.01); *H04W 76/10* (2018.02); *H04W 88/06* (2013.01)

(58) Field of Classification Search
CPC ...... C10M 2207/144; C10M 2215/064; C10M 2215/28; C10M 2219/044; C10M 2227/065; C10M 2227/066; C10M 2227/09; C10N 2010/02; C10N 2010/04; C10N 2010/08; C10N 2010/12; C10N 2030/04; C10N 2030/06; C10N 2030/52; C10N 2040/255; H04W 76/15; H04W 4/40; H04W 28/24; H04W 40/12; H04W 72/543; H04W 76/10; H04L 45/22; H04L 45/24; H04L 45/302
See application file for complete search history.

(56) References Cited

U.S. PATENT DOCUMENTS

| | | | |
|---|---|---|---|
| 2011/0116459 | A1 | 5/2011 | Lee et al. |
| 2012/0106469 | A1 | 5/2012 | Yousefi et al. |
| 2013/0051266 | A1 | 2/2013 | Kim et al. |
| 2013/0097304 | A1 | 4/2013 | Asthana et al. |
| 2013/0202286 | A1* | 8/2013 | Boyd ................... H04B 10/032 398/5 |
| 2014/0078898 | A1 | 3/2014 | Anchan et al. |
| 2014/0161103 | A1 | 6/2014 | Sirotkin et al. |
| 2014/0256314 | A1* | 9/2014 | Zhang .................. H04W 76/15 455/426.2 |
| 2015/0052360 | A1 | 2/2015 | Ravishankar et al. |
| 2015/0131578 | A1* | 5/2015 | Baek ..................... H04B 7/024 370/329 |
| 2015/0181638 | A1 | 6/2015 | Tabet et al. |
| 2016/0127945 | A1 | 5/2016 | Cui et al. |
| 2016/0142927 | A1 | 5/2016 | Yilmaz et al. |
| 2016/0255551 | A1 | 9/2016 | Susitaival et al. |
| 2017/0026950 | A1* | 1/2017 | Cao ....................... H04L 5/0032 |
| 2017/0041900 | A1 | 2/2017 | Wallentin et al. |
| 2017/0188407 | A1 | 6/2017 | Zee et al. |
| 2017/0289021 | A1 | 10/2017 | Saily et al. |
| 2017/0302427 | A1 | 10/2017 | Stattin et al. |
| 2018/0240339 | A1* | 8/2018 | Moisio .................... H04W 4/44 |
| 2019/0320476 | A1 | 10/2019 | Wang et al. |

OTHER PUBLICATIONS

"International Application Serial No. PCT/US2015/066688, International Search Report mailed Jul. 25, 2016", 4 pgs.

"International Application Serial No. PCT/US2015/066688, Written Opinion mailed Jul. 25, 2016", 9 pgs.

Michelle, M. DO, "SK Telecom's Network Evolution Strategies", Korea Communication Review, Netmanias, [Online] 4 retrieved from the internet: <http://www.netmanias.com/en/?m,=view&id=reports&no=6645&vm=pdf>, (Oct. 2014).

* cited by examiner

DUAL CONNECTIVITY FOR RELIABILITY

CLAIM OF PRIORITY

This patent application is a continuation of U.S. patent application Ser. No. 17/032,178, titled "Dual Connectivity for Reliability", filed Sep. 25, 2020, which is a continuation of U.S. patent application Ser. No. 15/749,717, titled "Dual Connectivity for Reliability", filed Feb. 1, 2018, which is a U.S. National Stage Application under 35 U.S.C. 371 from International Application No. PCT/US2015/066688, filed Dec. 18, 2015, published as WO 2017/039736, which claims the benefit of priority of U.S. Provisional Patent Application Ser. No. 62/212,235, entitled "Dual Connectivity for Reliability." filed on Aug. 31, 2015, which are hereby incorporated by reference herein in their entireties. The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to dual connectivity for device to vehicle or vehicle to vehicle communication.

BACKGROUND

Wireless communications are evolving into more areas and different types of devices. One new type of wireless communication involves vehicle communication, such as vehicle to vehicle (V2V) and vehicle to everything (V2X) communication. Wireless communication systems that include vehicles may have connection difficulties or reliability problems. Pure signaling processing techniques such as advanced coding and modulation schemes or advanced interference cancellation schemes may not be sufficient to achieve liability and latency requirements of vehicle wireless communication systems. For example, in cases of long-term channel deep fading or blockage, robust signaling processing schemes which are designed for mitigating short term outages/errors would be insufficient.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
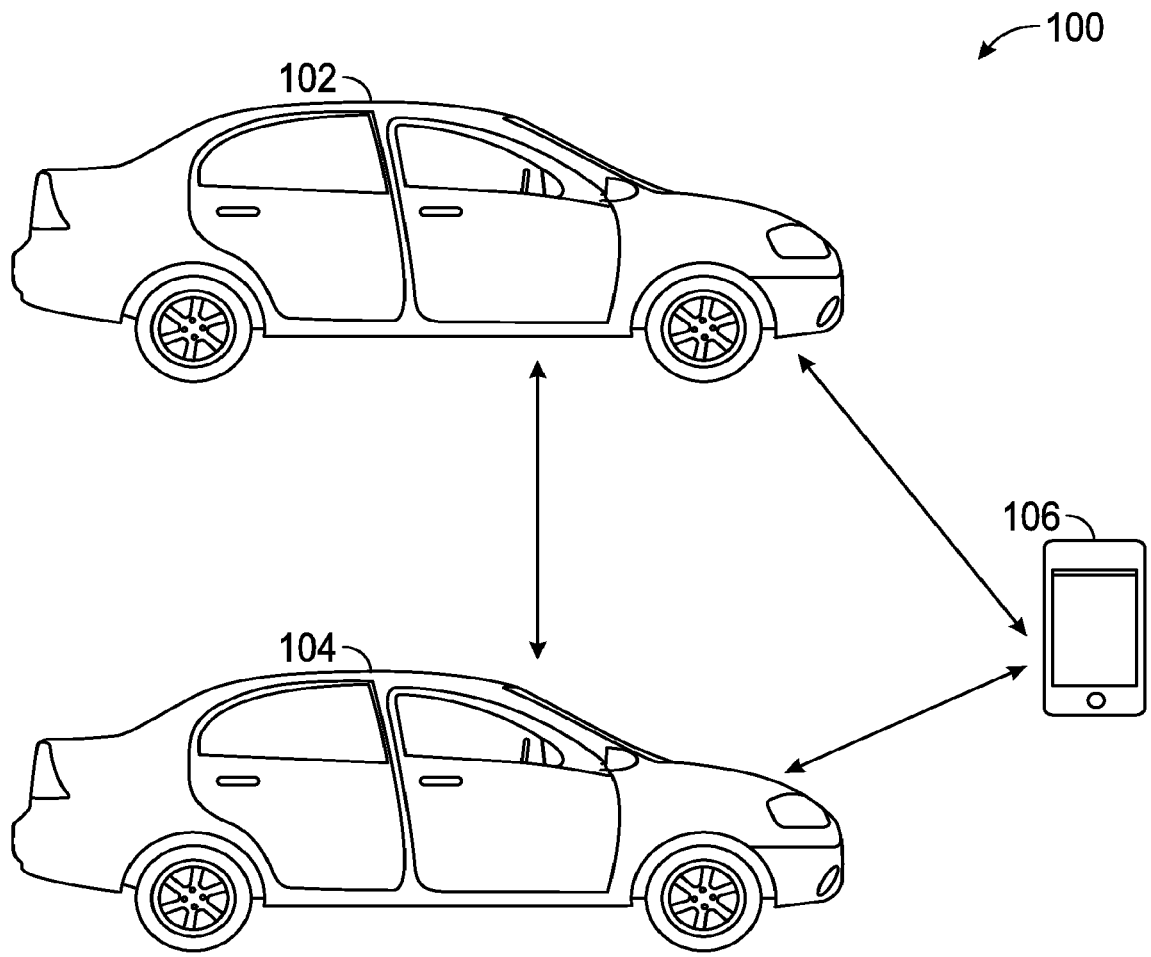
FIG. 1 is a functional diagrams illustrating connections for vehicle to vehicle or vehicle to device communications in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

5G wireless communication systems focus on reliability. In scenarios such as vehicle to vehicle (V2V) and vehicle to everything (V2X) communications, reliability may be the foremost system design target. A dual connectivity scheme for enhancing reliability is disclosed herein. The dual connectivity scheme may be generally applicable for any mission critical communications, such as high reliability communications based on any radio access technology (RAT), including LTE and 5G RATs. The dual connectivity scheme may include using a backup transmission to maintain reliability, using a Quality of Service (QoS) class and indicator for reliability and latency throughout the protocol stack, and cross-layer control and scheduling for managing primary and backup transmissions.

Existing techniques focus on using advanced coding and signal processing schemes for robustness. However, the radio link failure due to deep fading and blockage in a wireless channel cannot be rectified by advanced coding and signal processing schemes. The deep fading and blockage effect is even more severe at high frequency band, which is where the new frequency band for 5G will reside, for example, the 5.9 GHz band for V2V/V2X communication, or the millimeter wave bands.

The techniques described herein include a dual connection system that uses backup link for reliability. Efficient implementation of the backup transmission includes differentiated protection on the information, which further includes a new type of QoS indicator to be used throughout the protocol stack. Cross-layer control and scheduling may be used to manage the primary and backup link transmissions.

In an example, dual connectivity is used to ensure communication reliability. In addition to a primary link, a backup link may be used to provide redundancy for reliable transmission. In an example, the backup transmission may be at the same RAT and different carrier as the primary link. In another example, the backup transmission may be at a different transmission point from the primary link In yet another example, the backup transmission may be at different RAT from the primary link.

A message may be differentiated and protected at different reliability levels, such as a hot standby, a warm standby, or a cold standby. To determine whether to use a hot, warm, or cold standby, a new QoS class and indicator may be checked. The QoS indicator may be used to tag a message according to its importance. The backup connectivity system may apply cross layer control to coordinate the primary and backup transmissions. For example, higher layer control may be used to coordinate and instruct the scheduling and transmission at the lower layer.

The three types of backup transmission include different protection levels. In an example, a hot standby includes simultaneously transmitting a message on a backup link together with a primary link. A QoS indicator may indicate the hot standby, which includes dual transmissions for a message that has a high level of importance. These messages with a QoS indicator for hot standby may include messages sent for collision avoidance (e.g., lane assist or lane correction), safety measures, or the like. In another example, other messages with a QoS indicator for hot standby may include user indicated high priority messages, system indicated high priority messages, or governmental high priority messages.

In another example, the warm standby includes a backup link running in the background and retaining the context of a primary link. If the primary link fails, the backup link can retransmit immediately. The warm standby differs from the hot standby in that the warm standby does not always retransmit, but instead retransmits when the primary transmission fails, whereas the hot transmission always retransmits, before it is known whether the primary transmission was successful or failed. The warm standby may include messages relating to road traffic, such as congestion, routing or rerouting information, rush hour traffic information, weather, road conditions, or the like. In another example, other messages with a QoS indicator for warm standby may include user indicated medium priority messages, system indicated medium priority messages, or governmental medium priority messages.

In yet another example, a cold standby may include a backup link in an idle state. After a primary link fails, the backup link in cold standby wakes up and fetches the context for retransmission. The cold standby, like the warm standby, only retransmits on the backup transmission link if the transmission on the primary link fails. The cold standby may include messages relating to traffic information for a user, entertainment messages, video, music, etc. In another example, other messages with a QoS indicator for cold standby may include user indicated low priority messages, system indicated low priority messages, or governmental low priority messages.

In an example, the hot standby provides the highest protection level and the cold standby the lowest. In an example, the cold standby offers the lowest overhead and the hot standby offers the highest overhead. Overhead may include number of transmissions, energy, battery usage, etc. The dual connectivity formed by the primary link and the backup link may be based on configuration options. For example, the hot standby may include using the same RAT, the same transmission point (TP), and a different carrier for the backup link. The warm standby may include using the same RAT, a different TP, and the same or a different carrier for the backup link. The cold standby may include using a different RAT, and the same or a different TP for the backup link.

FIG. 1 is a functional diagram 100 illustrating connections for vehicle to vehicle or vehicle to device communications in accordance with some embodiments. The functional diagram 100 includes a first vehicle 102, a second vehicle 104, and a User Equipment (UE) 106. Either vehicle 102 and 104 may include a car, a truck, a van, a boat, a plane, or the like. The UE 106 may include a mobile device, tablet, computer, Internet of Things (IoT) wearable device, etc. The vehicle 102 may communicate with the vehicle 104 over a vehicle to vehicle (V2V) connection. The vehicle 102 may communicate with the UE 106 over a vehicle to device (V2D) connection. In an example, the UE 106 may be located inside one of the vehicles 104 or 106. The vehicles 102 and 104 and the UE 106 may include processor circuitry and transceiver circuitry to process and send/receive instructions on primary and backup transmission links. The vehicles 102 and 104 and the UE 106 may be wireless communications devices. The vehicles 102 and 104 and the UE 106 may include memory, such as to store bearer configuration information.

Figure 2:
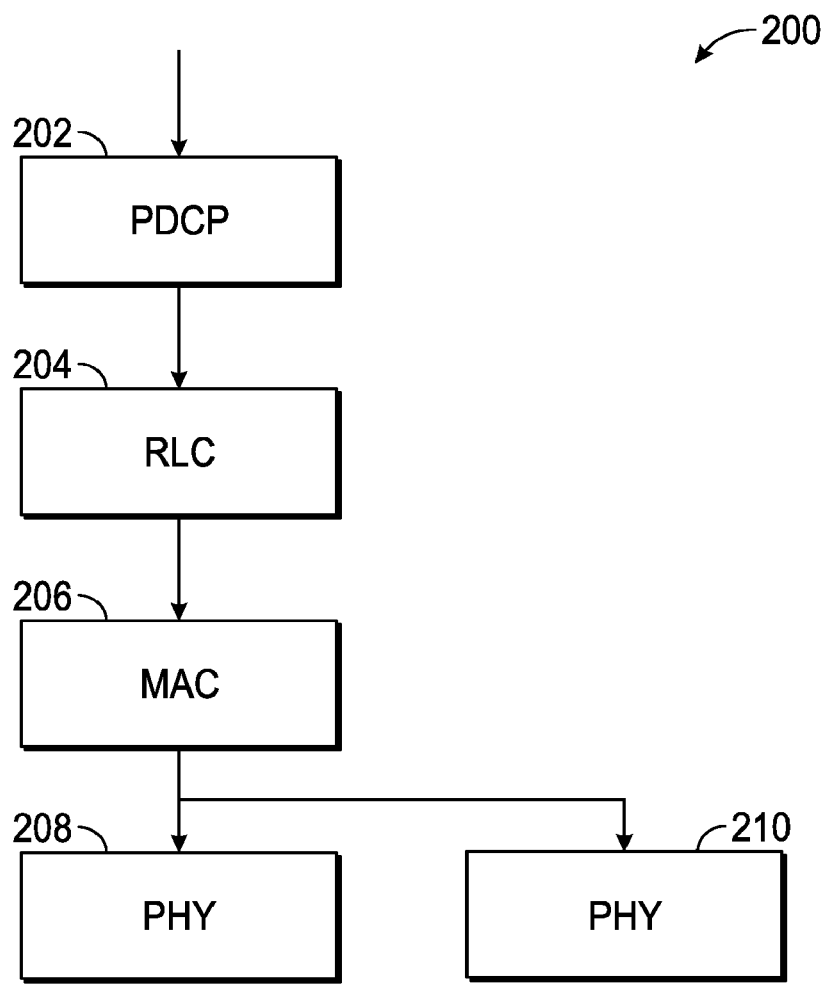
FIG. 2 is a functional diagram illustrating a hot backup standby transmission setup in accordance with some embodiments.
Figure 3A:
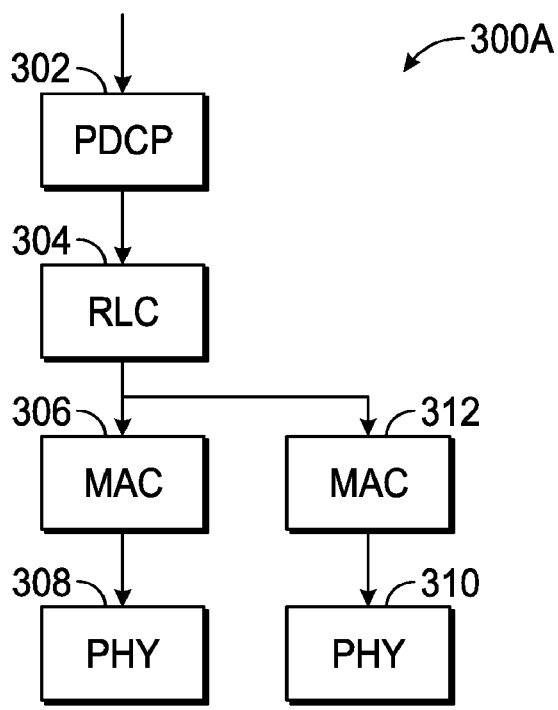
FIGS. 3A-C are functional diagrams illustrating warm backup standby transmission setups in accordance with some embodiments.
Figure 3B:
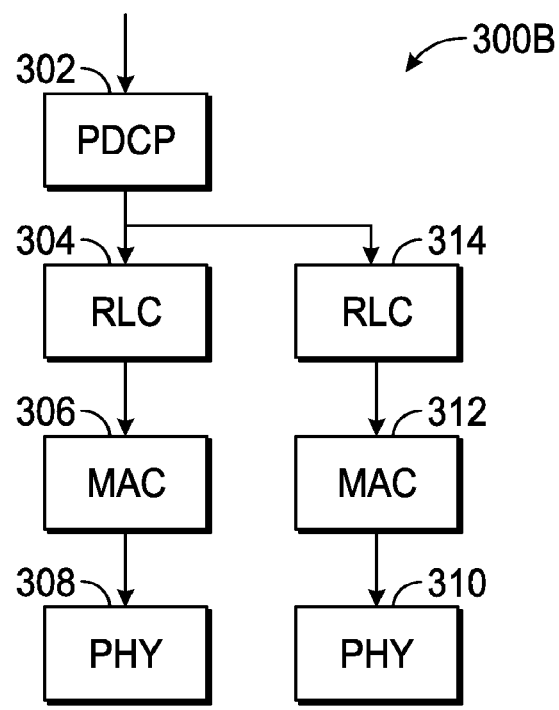
Figure 3C:
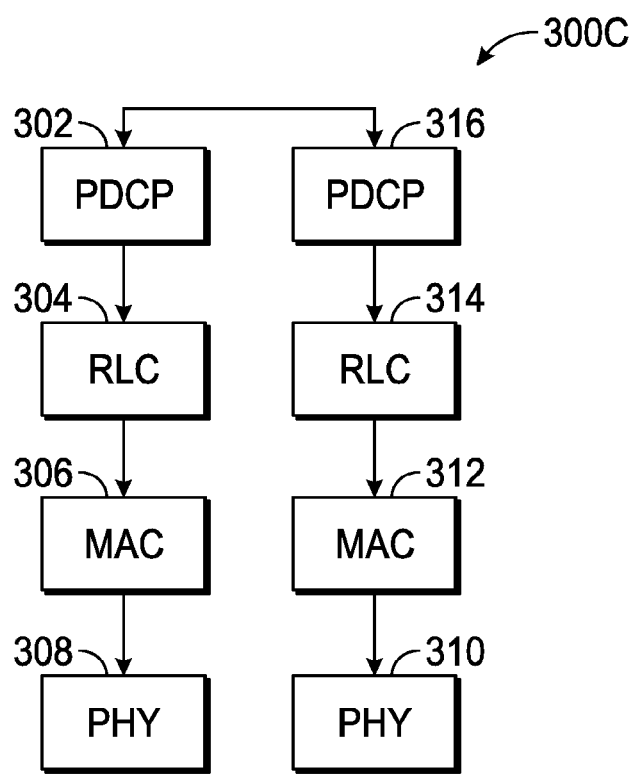
Figure 4:
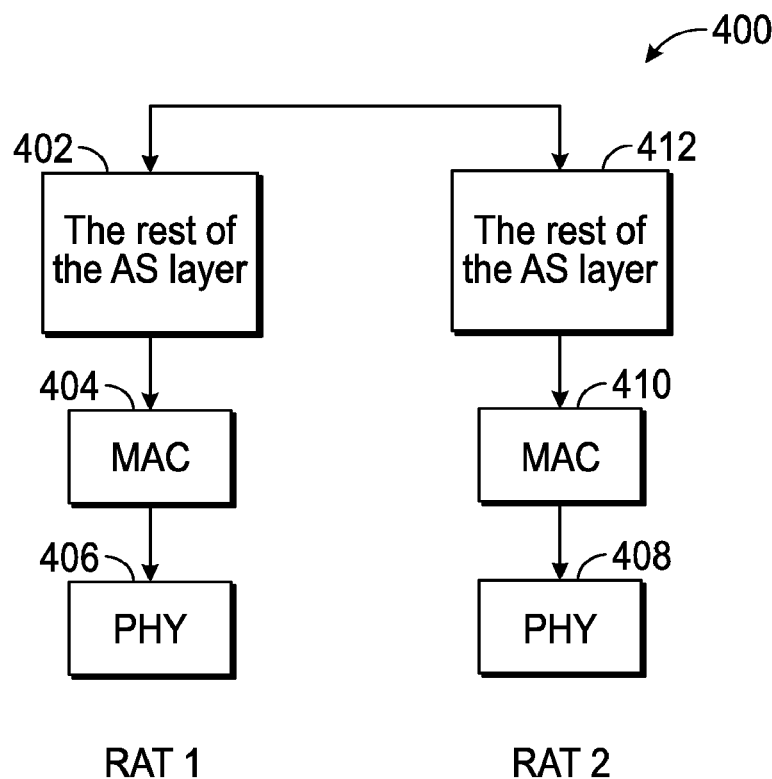
FIG. 4 is a functional diagram illustrating a cold backup standby transmission setup in accordance with some embodiments.

The three dual connectivity architectures shown in FIGS. 2-4 are applicable to each of the backup transmission types, with different handling on control and scheduling.

In an example, the hot and warm standby options may use LTE RAT as an example. For the hot standby, bearer duplication may be placed in between the medium access control (MAC) and the physical (PHY) layer as shown in FIG. 2. For the warm standby, the bearer duplication may be placed in between two of the higher layers as shown in FIGS. 3A-C. In an example, the duplication may be placed between these higher layers due to backhaul considerations. For the cold standby, the bearer duplication may be placed above access stratum (AS) layers, as shown in FIG. 4. For the examples in FIGS. 2 and 3A-C, the level above the split may retain a context and share the context with both of the lower level links. For example, the level retaining the context may include the MAC 206 in FIG. 2, the radio link control (RLC) 304 in FIG. 3A, the packet data convergence protocol (PDCP) 302 in FIG. 3B, and a higher level than the AS layers in FIG. 3C.

FIG. 2 is a functional diagram illustrating a hot backup standby transmission setup 200 in accordance with some embodiments. For the hot standby setup 200, implementation of dual connectivity may transmit over a primary link and backup link simultaneously. The two links may be scheduled to transmit simultaneously using the same PDCP 202, RLC 204, and MAC 206. The hot standby setup 200 includes a primary PHY 208 and a backup PHY 210 on the physical layer. The hot standby setup 200 includes transmitting data over both the primary PHY 208 and the backup PHY 210 simultaneously.

FIGS. 3A-C are functional diagrams illustrating warm backup standby transmission setups 300A-C in accordance with some embodiments. For the warm standby setups 300A-C, the scheduler of the backup link keeps updated with the primary link transmission, so that when the primary link fails, the backup link may retransmit. The warm standby setups 300A-C use high layer control over the backup link transmission. The warm standby setups 300A-C include a PDCP 302, RLC 304, MAC 306, PHY 308, PHY 310, and MAC 312. The differences between the warm standby setups 300A-C are in where the backup link begins. For example, FIG. 3A includes setup 300 A with the backup between the RLC 304 and the MAC layer, including the primary MAC 306 and the backup MAC 312. In another example, FIG. 3B includes setup 300 B with the backup between the PDCP and RLC layers, including the primary RLC 304 and the backup RLC 314. In yet another example, FIG. 3C includes setup 300 C with the backup above the PDCP layer including the primary PDCP 302 and the secondary PDCP 316.

Implementation of dual connectivity for the warm and cold standbys uses cross-layer control. The primary link and the backup link have independent MAC and higher layers, and in order to transmit the safety related critical messages from the primary and the backup links, the scheduler of the links at the AS may be coordinated and controlled. For example, the controller may be the layer that the message may be duplicated at for the backup links.

FIG. 4 is a functional diagram illustrating a cold backup standby transmission setup 400 in accordance with some embodiments. For the cold standby, the cross-layer control may not be needed. In case the primary link fails, the backup link may retransmit based on its own scheduling. The cold backup standby transmission setup 400 includes dual connectivity at all layers, including a primary link with PHY 406, MAC 404, and the remainder of the AS layer 402, and a backup link with PHY 408, MAC 410, and the remainder of the AS layer 412.

In an example, the new QoS class and indicator for reliability and latency may identify an importance level of the data being sent. To implement the different types of backup transmissions, the information content may be differentiated and treated with different protection levels. In an example, the information carried in V2V/V2X communications may be classified as one of the following QoS classes: transportation safety, transportation efficiency or on-road information/entertainment. The new QoS indicator may be defined for each of the QoS information classes. For example, the table below shows an implementation of QoS indicators for different information types, including packet delay budgets and packet error loss rates. In another example, information, data, or a message may be classified as not needing a backup. In this case, the primary link may resend the failed information, data, or message, without using a backup link.

TABLE 1

QoS Implementation

| QC1 | Information type | Priority | Packet Delay Budget | Packet Error Loss Rte |
|---|---|---|---|---|
| 1 | Transportation Safety | 1 | 1 ms to 2 ms | $10^{-6}$ |
| 2 | Transportation Efficiency | 2 | 10 ms to 50 ms | $10^{-3}$ |
| 3 | On-Road Information or Entertainment | 3 | 100 ms | $10^{-2}$ |

Figure 5:
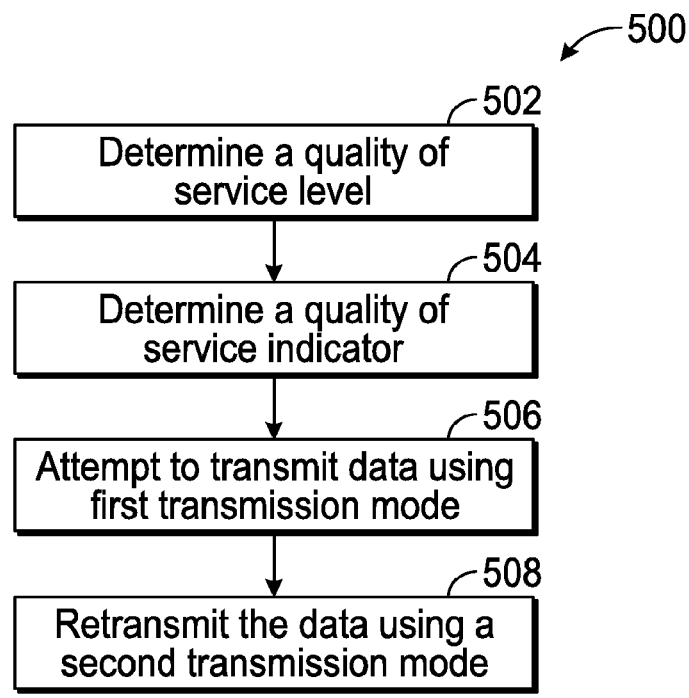
FIG. 5 is a flowchart illustrating a technique for dual connectivity in accordance with some embodiments.

FIG. 5 is a flowchart illustrating a technique 500 for dual connectivity in accordance with some embodiments. The technique 500 includes an operation 502 to determine a quality of service (QoS) level for data to be transmitted over a first radio access technology (RAT) connection. The technique 500 includes an operation 504 to determine a QoS indicator from the QoS level. The QoS indicator may identify a dual connectivity backup transmission, the dual connectivity backup transmission including a hot, warm, or cold backup.

The technique 500 includes an operation 506 to attempt to transmit data using the first transmission mode. The first transmission mode may include using the first RAT connection. In an example, the data may include the QoS indicator. For example, the QoS indicator may be sent over the first transmission mode. The first transmission mode may determine that a failure has occurred in the transmission or reception of the data. For example, the first transmission mode may determine the failure based on a lack of response or a response indicating a failure. The first transmission mode may then send an indication to the second transmission mode to initiate the backup transmission.

The technique 500 includes an operation 508 to retransmit, in response to the attempt failing, the data using a second transmission mode. The second transmission mode may use a second RAT connection different from the first RAT connection in the cold backup. In an example, the first RAT connection or the second RAT connection may operate on a 3GPP LTE network. In another example, the first RAT connection or the second RAT connection may operate on a 5G network. In another example, the RAT connections may include WiFi, Bluetooth, or the like.

In an example, the first transmission mode and the second transmission mode use the first RAT connection in the hot backup and the warm backup. The second transmission may use a different transmission point than the first transmission mode in the warm backup. The first transmission mode and the second transmission mode may use the same carrier in the hot backup. The second transmission mode may use a different carrier than the first transmission mode, and the one of the two transmission modes may operate at a frequency below 6 GHz, such as 5.9 GHz, and the other transmission mode may operate at a frequency of 6 GHz.

The technique 500 may include an operation to configure a device performing the technique 500 to save bearer configuration information of the first transmission mode to be used by the second transmission mode, so that the second transmission mode may retransmit the data. The device may include an Internet of Things (IoT) wearable device. The device may communicate with a vehicle using vehicle to vehicle (V2V) communication or vehicle to everything (V2X) communication.

Figure 6:
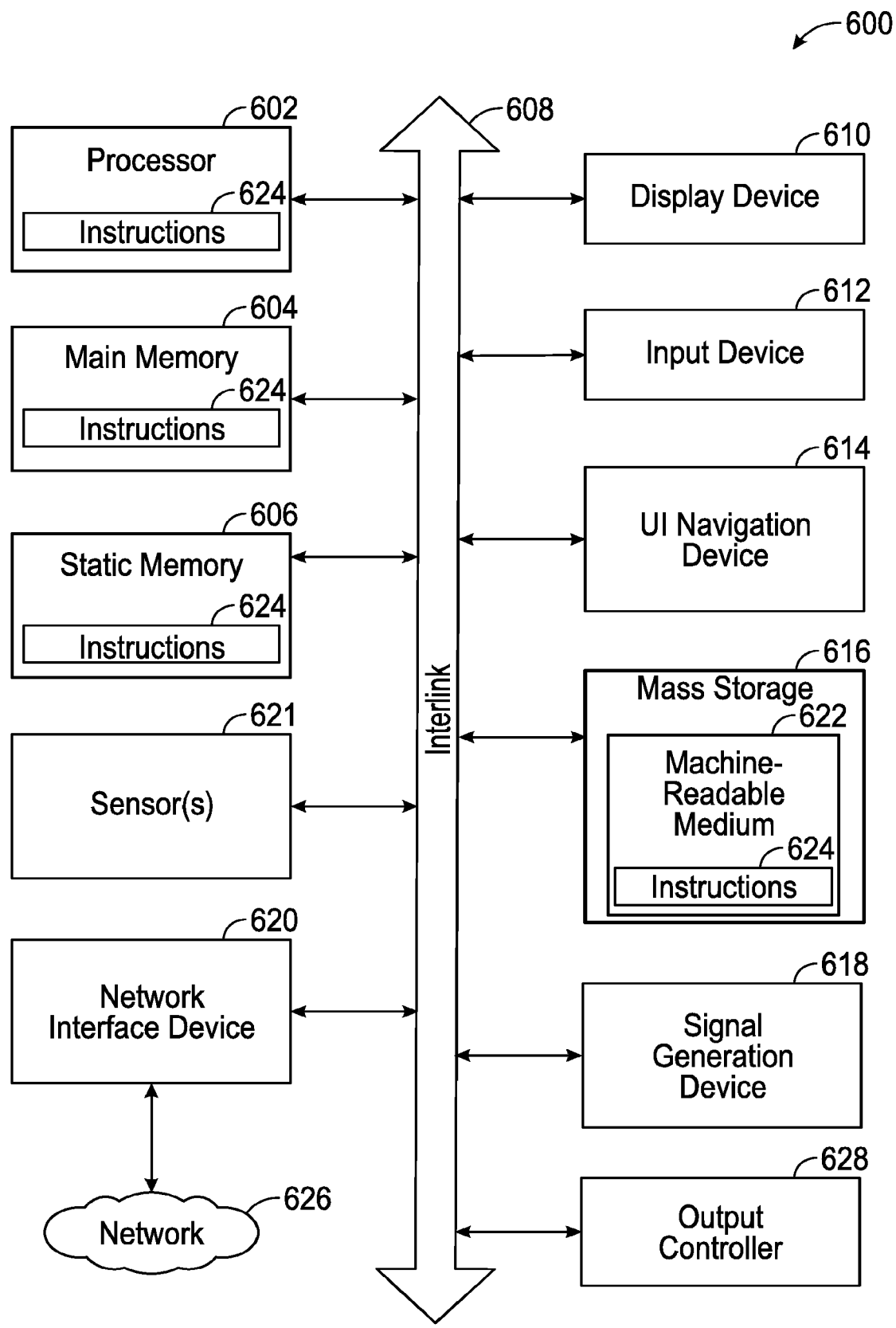
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Figure 7:
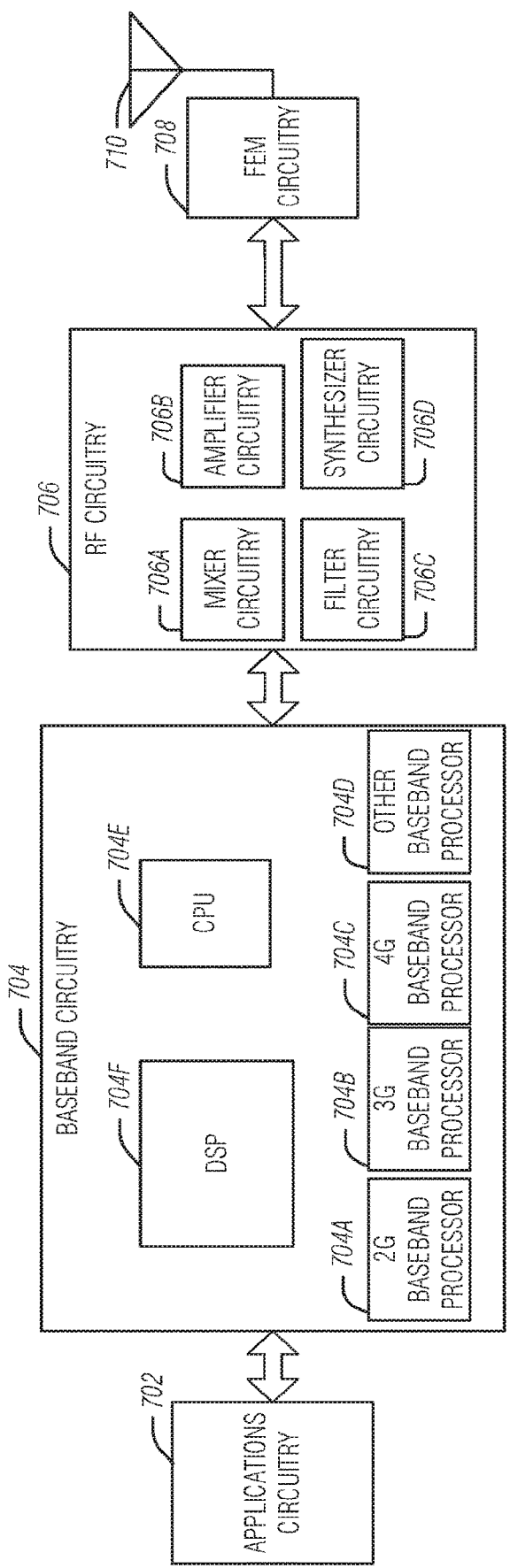
FIG. 7 illustrates, for one embodiment, example components of a User Equipment (UE) device.

FIG. 7 illustrates, for one embodiment, example components of a User Equipment (UE) device 700. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. In some embodiments, the UE device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), preceding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the UE device 700 may include additional elements such as, for example, memory/storage, display, camera, sensor, and/or input/output (I/O) interface.

VARIOUS NOTES & EXAMPLES

Each of these non-limiting examples may stand on its own, or may be combined in various permutations or combinations with one or more of the other examples.

Example 1 is an apparatus of a User Equipment (UE), the apparatus comprising: processing circuitry to: determine a quality of service (QoS) level for data to be transmitted over a first radio access technology (RAT) connection; determine a QoS indicator from the QoS level, the QoS indicator identifying a dual connectivity backup transmission, the dual connectivity backup transmission including a hot backup, a warm backup, or a cold backup; transceiver circuitry to: attempt to transmit the data using a first transmission mode, the first transmission mode using the first RAT connection and the data including the QoS indicator; and retransmit, in response to the attempt failing, the data using a second transmission mode.

In Example 2, the subject matter of Example 1 optionally includes, wherein the second transmission mode uses a second RAT connection different from the first RAT connection in the cold backup when the first RAT is configured in the first transmission mode.

In Example 3, the subject matter of Example 2 optionally includes, wherein the first RAT connection operates on a 3GPP LTE network and the second RAT connection operates on a 5G network.

In Example 4, the subject matter of any one or more of Examples 1-3 optionally include, wherein the first transmission mode and the second transmission mode use the first RAT connection in the hot backup and the warm backup.

In Example 5, the subject matter of Example 4 optionally includes, wherein the second transmission mode uses a different transmission point than the first transmission mode in the warm backup.

In Example 6, the subject matter of Example 5 optionally includes, wherein the first transmission mode and the second transmission mode use the same carrier in the hot backup.

In Example 7, the subject matter of any one or more of Examples 4-6 optionally include, wherein the second transmission mode uses a different carrier than the first transmission mode.

In Example 8, the subject matter of Example 7 optionally includes, wherein the first transmission mode operates at a frequency below 6 GHz and the second transmission mode operates at or above 6 GHz.

In Example 9, the subject matter of any one or more of Examples 1-8 optionally include, further comprising memory, and wherein the processing circuitry is to save, to the memory, bearer configuration information of the first transmission mode to be used by the second transmission mode to retransmit the data.

In Example 10, the subject matter of any one or more of Examples 1-9 optionally include, wherein the wireless communication device is an Internet of Things (IoT) wearable device.

In Example 11, the subject matter of any one or more of Examples 1-10 optionally include, wherein the wireless communication device is configurable to communicate with a vehicle using vehicle to vehicle (V2V) communication.

In Example 12, the subject matter of any one or more of Examples 1-11 optionally include-11, wherein the processing circuitry includes a baseband processor configured to determine the QoS level and the QoS indicator.

In Example 13, the subject matter of any one or more of Examples 1-12 optionally include, further comprising a transceiver, the transceiver being configured by the processing circuitry for transmission and reception.

In Example 14, the subject matter of Example 13 optionally includes, further comprising one or more antennas coupled to the transceiver.

Example 15 is a computer-readable storage medium that stores instructions for execution by one or more processors of a user equipment (UE) to configure the UE to perform operations to: determine a quality of service (QoS) level for data to be transmitted over a first radio access technology (RAT) connection; determine a QoS indicator from the QoS level, the QoS indicator identifying a dual connectivity backup transmission, the dual connectivity backup transmission including a hot, warm, or cold backup; attempt to transmit the data using a first transmission mode, the first transmission mode using the first RAT connection; and retransmit, in response to the attempt failing, the data using the dual connectivity backup transmission.

In Example 16, the subject matter of Example 15 optionally includes, wherein the dual connectivity backup transmission uses a second RAT connection different from the first RAT connection in the cold backup when the first RAT is configured in the first transmission mode.

In Example 17, the subject matter of Example 16 optionally includes, wherein the first RAT connection operates on a 3GPP LTE network and the second RAT connection operates on a 5G network.

In Example 18, the subject matter of any one or more of Examples 15-17 optionally include, wherein the first transmission mode and the dual connectivity backup transmission use the first RAT connection in the hot backup and the warm backup.

In Example 19, the subject matter of Example 18 optionally includes, wherein the dual connectivity backup transmission uses a different transmission point than the first transmission mode in the warm backup.

In Example 20, the subject matter of Example 19 optionally includes, wherein the first transmission mode and the dual connectivity backup transmission use the same carrier in the hot backup.

In Example 21, the subject matter of any one or more of Examples 18-20 optionally include, wherein the second transmission mode uses a different carrier than the first transmission mode.

In Example 22, the subject matter of Example 21 optionally includes, wherein the first transmission mode operates at a frequency below 6 GHz and the second transmission mode operates at or above 6 GHz.

In Example 23, the subject matter of any one or more of Examples 15-22 optionally include, further comprising operations to save, to memory, bearer configuration information of the first transmission mode to be used by the second transmission mode to retransmit the data.

In Example 24, the subject matter of any one or more of Examples 15-23 optionally include, wherein the UE is an Internet of Things (IoT) wearable device.

In Example 25, the subject matter of any one or more of Examples 15-24 optionally include, wherein the UE is configurable to communicate with a vehicle using vehicle to vehicle (V2V) communication.

Example 26 is a method for configuring a user equipment (UE), the method comprising: determining a quality of service (QoS) level for data to be transmitted over a first radio access technology (RAT) connection; determining a QoS indicator from the QoS level, the QoS indicator identifying a dual connectivity backup transmission, the dual connectivity backup transmission including a hot, warm, or cold backup; attempting to transmit the data using a first transmission mode, the first transmission mode using the first RAT connection; and retransmitting, in response to the attempt failing, the data using the dual connectivity backup transmission.

In Example 27, the subject matter of Example 26 optionally includes, wherein the dual connectivity backup transmission uses a second RAT connection different from the first RAT connection in the cold backup when the first RAT is configured in the first transmission mode.

In Example 28, the subject matter of Example 27 optionally includes, wherein the first RAT connection operates on a 3GPP LTE network and the second RAT connection operates on a 5G network.

In Example 29, the subject matter of any one or more of Examples 26-28 optionally include, wherein the first transmission mode and the dual connectivity backup transmission use the first RAT connection in the hot backup and the warm backup.

In Example 30, the subject matter of Example 29 optionally includes, wherein the dual connectivity backup transmission uses a different transmission point than the first transmission mode in the warm backup.

In Example 31, the subject matter of Example 30 optionally includes, wherein the first transmission mode and the dual connectivity backup transmission use the same carrier in the hot backup.

In Example 32, the subject matter of any one or more of Examples 29-31 optionally include, wherein the second transmission mode uses a different carrier than the first transmission mode.

In Example 33, the subject matter of Example 32 optionally includes, wherein the first transmission mode operates at a frequency below 6 GHz and the second transmission mode operates at or above 6 GHz.

In Example 34, the subject matter of any one or more of Examples 26-33 optionally include, further comprising saving, to memory, bearer configuration information of the first transmission mode to be used by the second transmission mode to retransmit the data.

In Example 35, the subject matter of any one or more of Examples 26-34 optionally include, wherein the UE is an Internet of Things (IoT) wearable device.

In Example 36, the subject matter of any one or more of Examples 26-35 optionally include, wherein the UE is configurable to communicate with a vehicle using vehicle to vehicle (V2V) communication.

Example 37 is a computer-readable storage medium that stores instructions for execution by one or more processors of a user equipment (UE) to configure the UE to perform operations of any of the methods of Examples 26-36.

Example 38 is an apparatus comprising means for performing any of the methods of Examples 26-36.

Example 39 is an apparatus of a User Equipment (UE), the apparatus comprising: processing circuitry to: determine a quality of service (QoS) level for data to be transmitted over a first carrier; determine a QoS indicator from the QoS level, the QoS indicator identifying a dual connectivity backup transmission, the dual connectivity backup transmission including a hot backup, a warm backup, or a cold backup; transceiver circuitry to: attempt to transmit the data using a first transmission mode, the first transmission mode using the first carrier and the data including the QoS indicator; and retransmit, in response to the attempt failing, the data using a second transmission mode.

In Example 40, the subject matter of Example 39 optionally includes, wherein the second transmission mode uses a second carrier in the cold backup, the warm backup, and the hot backup.

In Example 41, the subject matter of Example 40 optionally includes, wherein the first transmission mode operates at a frequency below 6 GHz and the second transmission mode operates at or above 6 GHz.

In Example 42, the subject matter of any one or more of Examples 39-41 optionally include, wherein the second transmission mode uses a different transmission point than the first transmission mode in the warm backup.

In Example 43, the subject matter of any one or more of Examples 39-42 optionally include, wherein the first transmission mode and the second transmission mode use a RAT connection in the hot backup and the warm backup.

Example 44 is a computer-readable storage medium that stores instructions for execution by one or more processors of a user equipment (UE) to configure the UE to perform to: determine a quality of service (QoS) level for data to be transmitted over a first carrier; determine a QoS indicator from the QoS level, the QoS indicator identifying a dual connectivity backup transmission, the dual connectivity backup transmission including a hot backup, a warm backup, or a cold backup; attempt to transmit the data using a first transmission mode, the first transmission mode using the first carrier and the data including the QoS indicator; and retransmit, in response to the attempt failing, the data using a second transmission mode.

In Example 45, the subject matter of Example 44 optionally includes, wherein the second transmission mode uses a second carrier in the cold backup, the warm backup, and the hot backup.

In Example 46, the subject matter of Example 45 optionally includes, wherein the first transmission mode operates at a frequency below 6 GHz and the second transmission mode operates at or above 6 GHz.

In Example 47, the subject matter of any one or more of Examples 44-46 optionally include, wherein the second transmission mode uses a different transmission point than the first transmission mode in the warm backup.

In Example 48, the subject matter of any one or more of Examples 44-47 optionally include, wherein the first transmission mode and the second transmission mode use a RAT connection in the hot backup and the warm backup.

Example 49 is a method for configuring a User Equipment (UE), the method comprising: determining a quality of service (QoS) level for data to be transmitted over a first carrier; determining a QoS indicator from the QoS level, the QoS indicator identifying a dual connectivity backup transmission, the dual connectivity backup transmission including a hot backup, a warm backup, or a cold backup; attempting to transmit the data using a first transmission mode, the first transmission mode using the first carrier and the data including the QoS indicator; and retransmitting, in response to the attempt failing, the data using a second transmission mode.

In Example 50, the subject matter of Example 49 optionally includes, wherein the second transmission mode uses a second carrier in the cold backup, the warm backup, and the hot backup.

In Example 51, the subject matter of Example 50 optionally includes, wherein the first transmission mode operates at a frequency below 6 GHz and the second transmission mode operates at or above 6 GHz.

In Example 52, the subject matter of any one or more of Examples 49-51 optionally include, wherein the second transmission mode uses a different transmission point than the first transmission mode in the warm backup.

In Example 53, the subject matter of any one or more of Examples 49-52 optionally include, wherein the first transmission mode and the second transmission mode use a RAT connection in the hot backup and the warm backup.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method, comprising:
   establishing a first link between a first transmission point and a user equipment (UE);
   establishing a second link between a second transmission point and the UE;
   transmitting a first set of packets over the first link to the UE;
   retransmitting, in response to determining that the first link has failed and based at least in part on having an active connection with the second transmission point via the second link, the first set of packets over the second link to the UE, wherein each of the first and second transmission points include radio link control (RLC), medium access control (MAC), and physical (PHY) layers; and
   providing context of the first link to the second transmission point.

2. The method of claim 1, wherein the first link corresponds to a first radio access technology (RAT) and the second link corresponds to a second RAT.

3. The method of claim 2, wherein the first RAT operates on a 3GPP LTE network and the second RAT operates on a 5G network.

4. The method of claim 2, wherein the first RAT operates on a cellular network and the second RAT operates on a Bluetooth connection.

5. The method of claim 2, wherein the first RAT operates on a 3GPP LTE network or 5G network and the second RAT operates on a Wi-Fi connection.

6. The method of claim 1, wherein the first link corresponds to a first carrier and the second link corresponds to a second carrier.

7. The method of claim 6, wherein the first carrier is different from the second carrier.

8. The method of claim 1, wherein the first link and the second link correspond to a first carrier.

9. An apparatus, comprising:
at least one processor configured to cause a network node to:
establish a first link between a first transmission point and a user equipment (UE);
establish a second link between a second transmission point and the UE;
transmit a first set of packets over the first link to the UE;
retransmit, in response to determining that the first link has failed and based at least in part on having an active connection with the second transmission point via the second link, the first set of packets over the second link to the UE, wherein each of the first and second transmission points include radio link control (RLC), medium access control (MAC), and physical (PHY) layers; and
provide context of the first link to the second transmission point.

10. The apparatus of claim 9, wherein the first link operates at a frequency below 6 GHz and the second link operates at or above 6 GHz.

11. The apparatus of claim 9, wherein the UE is an Internet of Things (IoT) wearable device.

12. The apparatus of claim 11, wherein the IoT wearable device is configured to communicate with a vehicle using vehicle to vehicle (V2V) communication or vehicle to everything (V2X) communication.

13. The apparatus of claim 9, wherein the first link is a primary link and the second link is a backup link.

14. The apparatus of claim 13, wherein the backup link operates in a background of the primary link according to a warm standby mode.

15. A non-transitory computer readable medium storing program instructions executable by one or more processors of a network node to cause the network node to:
establish a first link between a first transmission point and a user equipment (UE);
establish a second link between a second transmission point and the UE;
transmit a first set of packets over the first link to the UE;
retransmit, in response to determining that the first link has failed and based at least in part on having an active connection with the second transmission point via the second link, the first set of packets over the second link to the UE, wherein each of the first and second transmission points include radio link control (RLC), medium access control (MAC), and physical (PHY) layers; and
provide context of the first link to the second transmission point.

16. The non-transitory computer readable medium of claim 15, wherein the first set of packets comprise one or more messages including a Quality of Service (QOS) indicator corresponding to a warm standby mode.

17. The non-transitory computer readable medium of claim 16, wherein the one or more messages including the QoS indicator further include at least one of:
user indicated medium priority messages;
system indicated medium priority messages; or
governmental medium priority messages.

18. The non-transitory computer readable medium of claim 15, wherein the first set of packets comprise one or more messages relating to at least one of:
road traffic;
congestion;
routing or re-routing information;
rush hour traffic information;
weather; or
road conditions.

19. The non-transitory computer readable medium of claim 15, wherein transmitting the first set of packets over the first link is performed according to a first transmission mode and retransmitting the first set of packets over the second link is performed according to a second transmission mode.

20. The non-transitory computer readable medium of claim 15, wherein the first link operates at a frequency below 6 gigahertz (GHz) and the second link operates at or above 6 GHz.

* * * * *